Patented Aug. 18, 1953

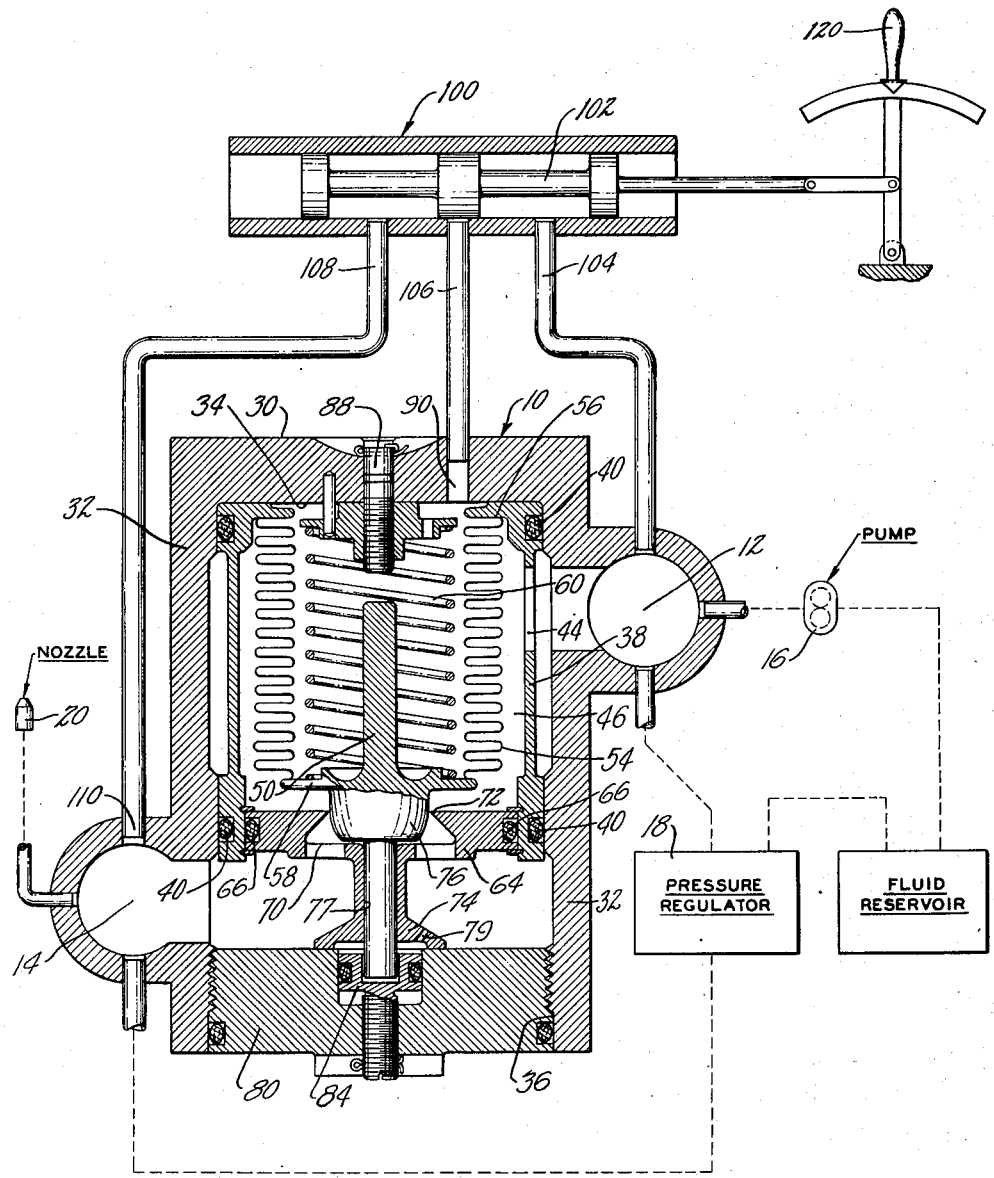

2,649,108

UNITED STATES PATENT OFFICE 2,649,108

PRESSURE ACTUATED THROTTLE VALVE

Stanley G. Best, Manchester, and David R. Pearl, West Hartford, Conn., assignors to United Aircraft Corporation, East Hartford, Conn., a corporation of Delaware Application January 10, 1951, Serial No. 205,404

4 Claims. (Cl. 137—117)

This invention relates to fluid flow throttle mechanisms and more particularly to sensitive throttle valves adapted for aircraft turbine power plants.

It is an object of this invention to provide a fluid throttle valve mechanism which is simple in construction yet highly responsive to produce a varied rate of fluid flow therethrough.

Another object of this invention is to provide a fluid throttling mechanism which is adapted to provide a first order or exponential curve of fluid flow versus valve stem travel when a predetermined pressure differential is maintained across the throttling orifice; other curve relations versus stem travel also being obtainable as desired.

A still further object of this invention is to provide a valve mechanism having a bellows and cooperating spring for inducing a fluid flow variation whereby the bellows is continuously exposed to inlet fluid pressure so that the spring tends to reduce fluid flow when the inside of the bellows is also exposed to inlet pressure and the bellows responds to increase fluid flow against the spring reaction when a pressure lower than inlet pressure is directed internally of the bellows.

These and other objects of this invention will become readily apparent from the following detailed description of the drawing in which:

The single figure is a partially detailed cross-sectional illustration of the valve mechanism with the associated parts shown schematically.

Referring to the figure, a throttling valve mechanism is generally indicated at 10 having an inlet 12 and an outlet 14. Fluid is taken from a reservoir and fed to the inlet 12 under pressure by means of a pump 16. The fluid passes through the valve mechanism to the outlet 14 normally at a pressure which is lower than the inlet pressure. A pressure regulator 18 is operatively connected to both the inlet 12 and the outlet 14 so as to maintain a predetermined pressure differential between the inlet and outlet of the valve mechanism. The pressure regulator 18 tends to drain fluid from the inlet 12 to the reservoir when the differential becomes excessive. The outlet 14 is connected to a fluid consuming device as for example a nozzle 20 such as may be utilized to direct fuel into a combustion chamber.

The valve mechanism 10 comprises a housing 30 having a side wall 32, an end wall 34 and an open end 36 which may be closed off by a closure member to be described hereinafter. A valve body 38 conforms to the inner surface of the housing 30 and is insertable therein for engagement with the inner wall of the housing. A plurality of O-ring seals 40 are provided between the body 38 and the housing 30 so as to have a fluid tight engagement therebetween. The body 38 includes an aperture 44 which provides communication between the inlet 12 and the chamber 46. A valve stem 50 is disposed centrally of the valve mechanism and is mounted for movement along its axis relative to the valve body 38 and the housing 30. A bellows 54 substantially surrounds the stem 50 and has one end thereof fixed as at 56 to the upper portion of the valve body 38 and its other end fixed to a flange 58 forming an integral part of the stem 50. The bellows is attached by any suitable means to form leakproof joints with the body 38 and the flange 58. A compression spring 60 engages the flange 58 on the valve stem 50 and also engages the upper portion of the valve body 38 tending to urge the valve stem in a downward or closed position. It should be noted that in place of the bellows a flexible wall may be used hence the term bellows used herein would include such equivalents.

A closure member 64 seals off the lower end of the valve body 38 by means of O-ring seals 66 and includes an orifice 70 whose defining lip 72 forms a variable orifice in cooperation with the contoured surface 76 on the valve stem 50. The contoured surface 76 is so shaped that as stated above a desired curve of fluid flow through the variable orifice is provided in proportion to the amount of valve stem travel when a predetermined pressure differential is maintained across the variable orifice.

The lip 72 is formed with a relatively sharp edge so that a sharp edged orifice is substantially formed in cooperation with the surface 76. As is understood in the art a sharp edged orifice minimizes the resultant effect of changes in fluid viscosity on the metered flow for a given pressure differential and valve position.

The closure member 64 includes a depending pedestal 74 which includes a central bore 77 for guiding the lower portion of the valve stem 50. An end plate 80 is threaded into the housing 30 to close off its open end 36 and is screwed into the housing so as to abut the pedestal 74. The end plate 80 includes a centrally threaded stop 84 which can be positioned along its axis relative to the end plate 80 thereby providing a minimum flow stop for the valve stem 50. A similar maximum flow stop 88 is provided in the closed end wall 34 of the housing 30 to provide a maximum flow limit for the valve stem 50.

A fluid passage 90 is provided in the end wall 34 which communicates internally of the bellows 54. It is then apparent that when the pressure externally and internally of the bellows 54 is equal the spring 60 will tend to move the valve stem 50 in a downward direction or toward a closed position. On the other hand, if the internal pressure of the bellows is at a value lower than the pressure externally thereof, the bellows will tend to move the valve stem upward or toward an open position against the reaction of the spring 60.

A bleed passage 79 is provided in the base of the pedestal 74 to equalize the pressure adjacent the lower end of the valve stem and prevent hydraulic locking between the stem and minimum stop 84. With the bleed 79 the pressure surrounding the pedestal 74 will be substantially the same as that existing in the bore 77 and hence no fluid flow will be initiated from adjacent the variable orifice downwardly between the lower portion of the valve stem and the bore 77. As a result any foreign particles in the fluid will not tend to deposit between the lower stem portion and the bore and greatly reduce sticking.

Since the bellows 54 is continuously exposed externally thereof to the inlet pressure, it is a simple matter to bleed inlet pressure internally of the bellows via the passage 99 so as to equalize pressure on either side of the bellows wall so as to permit the spring 60 to move the valve toward a closed position. To this end, a control valve 100 may be provided which includes a movable valve portion 102 to permit fluid under pressure to pass from the line 104 into the line 106 or to permit fluid under a reduced pressure to communicate between the line 108 and the line 106. When the reduced pressure or a drain pressure of any sort so communicates between the line 108 and the line 106 the internal pressure of the bellows will be less than its external pressure thereby tending to move the valve stem 50 toward an open position. Inasmuch as the inlet and outlet pressures for the valve mechanism are maintained at a predetermined differential, the line 108 of the control valve 100 may readily be connected as at 110 to the outlet 14. However, for varied installations the line 108 leading to the control valve 100 may be connected to any source of pressure which is lower than the pressure at the inlet 12 of the main valve 10.

In the case where the internal portion of the bellows communicates with the outlet of the valve mechanism (i. e., calling for maximum flow) the valve will actually act as a check valve in the event that the fluid to the inlet of the valve is greatly diminished. This function results from the fact that the pressure differential across the valve will diminish and the valve will tend to close the opening. In other words, upon a loss in pressure resulting from low supply the regulator will be unable to maintain the differential desired so that pressure internally and externally of the bellows will approach equality and the spring 60 will close the valve.

A manual control 120 may be provided to move the movable portion 102 of the control valve 100 as is illustrated.

It is evident that as a result of this invention a simple but highly responsive fluid throttle mechanism has been provided which is capable of being adapted to a variety of structures as well as a variety of operational conditions. Also since a predetermined pressure differential is maintained across the valve, a predetermined amount of fluid flow is obtained for every position of the valve.

Although only one embodiment of this invention has been illustrated and described herein it will be evident that various changes and modifications may be made in the construction and arrangement of the various parts without departing from the scope of this novel concept.

What it is desired to obtain by Letters Patent is:

1. In a throttle valve for a fluid under pressure, a valve housing having one open side and including inlet and outlet ports therein, a valve body positioned internally of said housing including sealing means engaging said housing, an intake passage in said body communicating with said inlet port, a valve stem movably carried internally of said body and including a contoured valve portion for metering the fluid, a valve member cooperating with said contoured portion and forming a passage communicating with said outlet port, said member comprising a closure for one end of said valve body, lock means for fixing said closure to said body, a bellows fixed to and coaxially disposed between said stem and body for moving the stem, a spring coaxially disposed between the wall of said bellows and said stem, and a port in a closed portion of said housing and body providing a separate communication path from outside said housing internally of said bellows.

2. In a throttle valve for a fluid under pressure, a valve housing having one open side and including inlet and outlet ports therein, a valve body positioned internally of said housing including a plurality of seals engaging said housing, an intake port in said body, a valve stem movably carried internally of said body and including a contoured valve portion for metering the fluid, a valve member cooperating with said contoured portion and forming a passage communicating with said outlet, said member comprising a closure for one end of said valve body, lock means for fixing said closure to said body, a bellows fixed at one end to said body and at its other end to said stem and coaxially disposed between said stem and body, a spring coaxially disposed between the wall of said bellows and said stem and urging the latter in one direction, a port in a wall portion of said housing and said body providing a separate path communicating from outside said housing internally of said bellows, a removable cap for closing off the open side of said valve housing, an abutment forming a stop engageable with said stem to prevent full closing of the passage formed by said contoured portion and valve member, and means for adjusting said stop along the axis of movement of said stem.

3. In a throttle valve mechanism adapted to receive fluid under pressure and discharge the fluid under throttled flow, a housing comprising, a side wall, a wall closing one end and an open other end, said housing having fluid inlet and outlet passages, a valve body fitted as a unit into said housing and including a sleeve like portion engaging the wall of said housing, sealing means between said housing and body, said body comprising, a port communicating with said inlet, a valve stem within said body and movable relative thereto, a bellows having one end fixed to said body and operatively connected to said stem, said bellows having a sealed relation to said stem and body, a compression spring engaging said housing and stem and coaxially disposed between said stem and the wall of said bellows, a contoured flow controlling surface on said stem, a closure member for said body adjacent the open end of said housing including an orifice cooperating with said contoured surface and communicating with said outlet port, means for positioning said closure member relative to said body, said closure member including a depending pedestal having a central passage forming a guide for said stem, a cap closing the open end of said housing and engaging said pedestal, said cap including an adjustable stop engaging one end of said stem, a second adjustable stop carried by the wall of the closed end of said housing and engageable with the other end of said stem, and a passage in said last mentioned wall providing a separate path of communication from outside said housing internally of said bellows.

4. In a fluid throttling mechanism, a source of fluid under pressure, a valve having an intake side receiving fluid from said source and a discharge side communicating with a fluid consuming device, regulator means for maintaining the pressure on each side of said valve at a predetermined differential, means for varying the flow of fluid from one side of said valve to the other, comprising a movable valve element having a bellows operatively connected thereto, a valve member cooperating with said element forming a variable opening, fixed stops engageable with said movable valve element for limiting the range of said opening, means urging said element in one direction consisting of a spring, the force of said fluid under pressure acting externally of said bellows urging said element in the opposite direction, and control means for controlling the opening of said valve throughout said range consisting of a pilot valve for selectively exposing the inside of said bellows to the pressures on the inlet and outlet side of said first mentioned valve.

STANLEY G. BEST.
DAVID R. PEARL.

References Cited in the file of this patent

UNITED STATES PATENTS

| Number | Name | Date |
|---|---|---|
| 1,136,211 | Collins | Apr. 20, 1915 |
| 2,005,266 | Ray | June 18, 1935 |
| 2,573,724 | Neal | Nov. 6, 1951 |

FOREIGN PATENTS

| Number | Country | Date |
|---|---|---|
| 733,322 | Germany | of 1943 |